Figure 1:
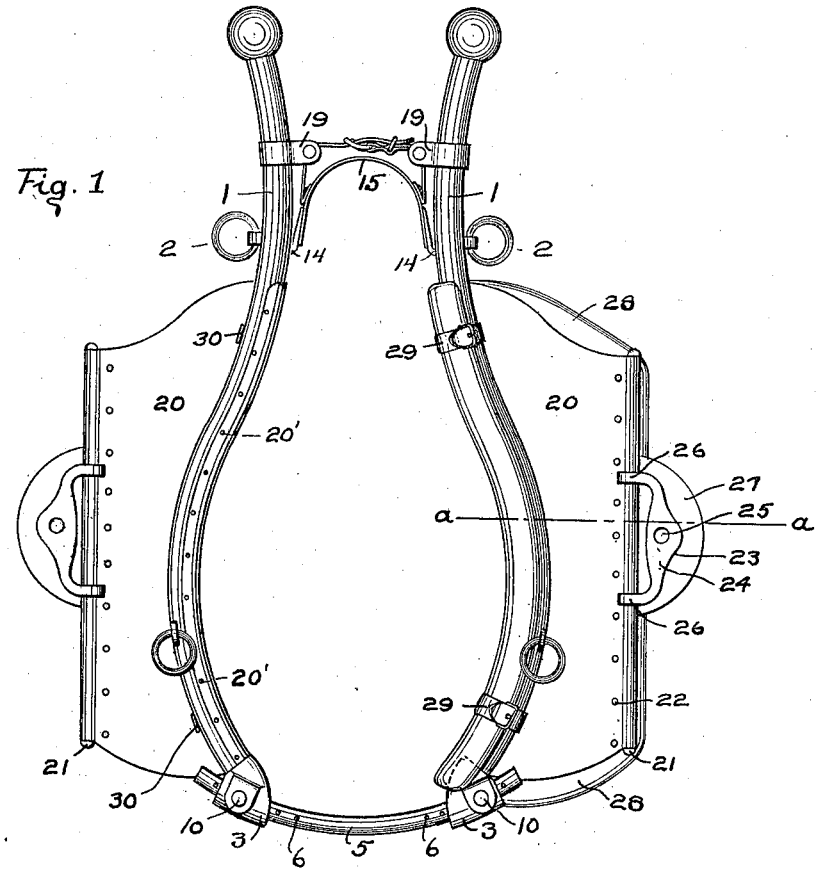

J. S. ASCHLIMAN.
HORSE COLLAR.
APPLICATION FILED OCT. 29, 1910.

1,001,726.

Patented Aug. 29, 1911.

2 SHEETS—SHEET 1.

Witnesses
J. N. Dickens,
Isaac N. Taylor

Inventor
John S. Aschliman
by Taylor & Huls
Attorneys.

J. S. ASCHLIMAN.
HORSE COLLAR.
APPLICATION FILED OCT. 29, 1910.
1,001,726.
Patented Aug. 29, 1911.
2 SHEETS—SHEET 2.
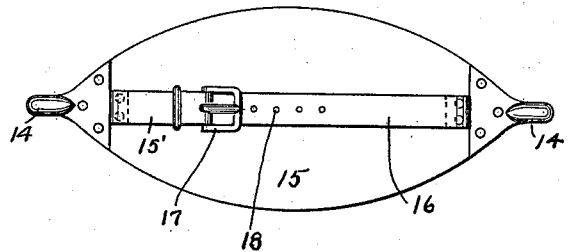
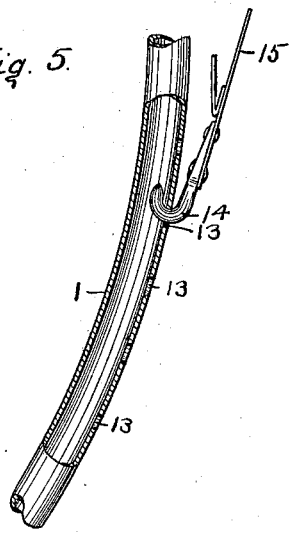
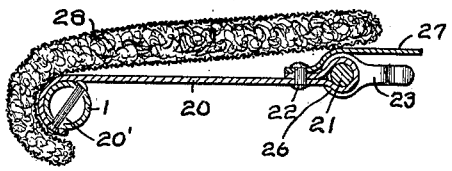
Witnesses
J. N. Dickens,
Isaac N. Taylor
Inventor
John S. Aschliman
by Taylor & Hulse
Attorneys.
COLUMBIA PLANOGRAPH CO., WASHINGTON, D. C.

UNITED STATES PATENT OFFICE.

JOHN S. ASCHLIMAN, OF NEAR BLUFFTON, INDIANA.

HORSE-COLLAR.

1,001,726. Specification of Letters Patent. Patented Aug. 29, 1911.

Application filed October 29, 1910. Serial No. 589,698.

*To all whom it may concern:*

Be it known that I, JOHN S. ASCHLIMAN, a citizen of the United States, residing near Bluffton, in the county of Wells and State of Indiana, have invented new and useful Improvements in Horse-Collars, of which the following is a specification.

This invention relates to horse collars and particularly to improvements in adjustable collars. Its object is to provide a collar which shall have great strength, durability and efficiency, and which may be cheaply manufactured and assembled.

Another object is to provide a collar which is adapted to be easily opened and closed and capable of ready adjustment to fit the neck of the animal to which it may be applied.

The invention consists in the novel features of construction and arrangement of parts hereinafter described and illustrated in the drawings, in which—

Figure 2:
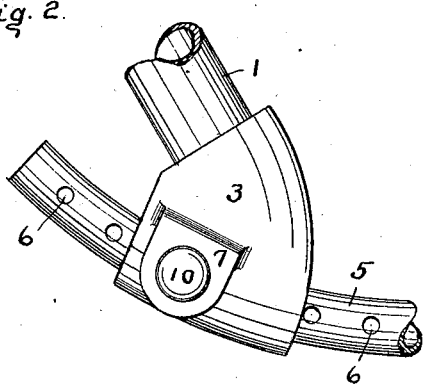
Figure 3:
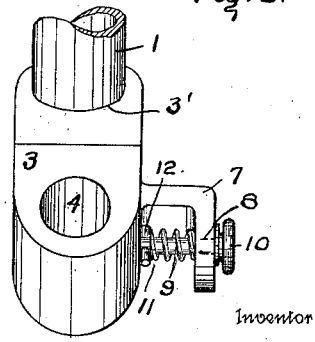

Figure 1 is a front elevation of a collar constructed according to my invention, one of the pads being removed; Fig. 2, a front elevational detail of the lower adjustable locking device; Fig. 3, a side elevation of Fig. 2; Fig. 4, a plan of the upper adjustable fastening; Fig. 5, a detail of one end of the fastening of Fig. 4 as engaged in the hame; Fig. 6, a plan of the adjustable strap holding collar for the upper fastening, and Fig. 7, a section on line a—a of Fig. 1.

Referring to the drawings, in which like reference characters indicate similar parts, 1, 1 are tubular hames having any suitable rein rings 2, 2. The lower end of each hame is in threaded engagement with a casting 3 in opening 3'. Each casting is provided with an opening 4 extending from one side face to the other and which is preferably beneath the lower end of the hame when casting 3 is assembled on the hame. This opening 4 is preferably curved upwardly to permit the easy insertion and sliding of one end of a member 5. This member 5 is preferably tubular in form and is provided on each extremity with a series of openings 6. On the front side of each casting is arranged an L-shaped extension 7 which supports, in an opening 8 therein, a slidable pin 9 having an operating handle 10 on its outer extremity. The inner end of this pin passes through an opening in the front side of casting 3 which leads into opening 4. Surrounding pin 9 is a spring 11, one end of which is secured to a pin 12 which is secured to pin 9 and the other end bears against extension 7. Pin 9 is of sufficient length to normally project through the casting into opening 4. When member 5 is inserted in opening 4, pin 9 is first drawn outwardly by means of handle 10, and member 5 may then be adjusted in the opening 4 until the desired opening 6 is in register with the pin 9 when that pin may be released and spring 11 will force it into the registering opening 6, thereby securely retaining together the member 5 and casting 3. The same operation may be performed, if desirable, on the other casting 3 and the other end of member 5.

The upper portion of the inner face of each hame 1 is provided with a series of openings 13, those in each hame being adapted to receive a hook 14 which is fixed to one end of a strap 15. This strap is extended to pass over the neck of the animal and is provided with sufficient width to act as a saddle by which the hames are supported on the animal. This strap is adjustable up and down by engaging the hooks 14 in any pair of openings 13 in the two hames. This adjustment enables the user to fit the collar to any animal. Strap 15 has secured to its opposite ends straps 15', 16, one strap carrying a buckle 17, the other having a series of perforations 18 to adjustably receive the tongue of the buckle. Each strap passes upwardly and through a holding collar 19 which is adjustable up and down on the hame. When collars 19 are properly located strap 16 may be drawn through buckle 17 to the desired point and the hames will then be securely held in their adjusted position.

Leather shields 20 are secured to the hames in a suitable manner, as by rivets 20', and, in use, extend outwardly over the shoulders of the animal. The outer edge of each shield has secured to it a rod 21 which is of considerable length, the shield preferably inclosing the rod by being wrapped about it, as shown in Fig. 7, and secured by rivets 22. Approximately midway of the length of each rod 21 is loosely secured a hame tug clip 23. This clip comprises a plate or other suitable portion 24 having an opening 25 therein in which the tug may be engaged, and having at each extremity an inward projection 26, which is curved around rod 21 and passes through an opening in shield 20.

These extensions 26 are not rigidly secured to rod 21, but have free rotational movement thereon. A shield 27 is secured to shield 20 back of rod 21 and projects outwardly beyond shield 20 and serves to protect the animal from contact with clip 23.

A pad 28 is secured to each hame by straps 29 which pass through openings 30 in shield 20, the pad extending around the portion of the hame, which will be in contact with the neck of the animal, and also outwardly so as to lie between shield 20 and the neck of the animal.

In fitting the collar to an animal the upper strap will be adjusted to draw the collar snugly about the neck, and the lower attachment may be adjusted to provide sufficient width for the lower portion of the collar. The collar may be quickly removed from the animal's neck by withdrawing either pin 9 from its engagement in one of openings 6, when the hames may be readily separated to withdraw member 5 from casting 3, and the collar then easily slips off the neck.

By providing the long rods 21 in the outer edges of the shields 20, to which the tugs are connected, the pressure on the animal in pulling is distributed over the length of the rods and shields and not confined to a small area, as is now the practice. This distribution of pressure minimizes, if not eliminates, the formation of abrasions and sores on the shoulders of the animal now commonly occurring and due to the small area occupied by the tug connections to the hames.

The several constructions above described may be varied in many ways without departing from the spirit of my invention, as for example, the tug clips 24 may be rigid or integral with rod 21 instead of loosely connected thereto.

It is apparent that the shield 20 is attached to the hame along the portion thereof which is in contact with the neck of the animal—the effective portion of the hame for pulling. The rod 21, being at the outer edge of the shield, lies, in use, at the side of the animal's shoulder, the shield covering practically the front of that shoulder.

What I claim is:

A collar comprising two hames each having a series of openings in its upper portion and a holding collar adjustably secured thereto, a saddle having a hook at each extremity adapted to engage the openings in the hame, straps secured to the extremities of the saddle and engaging the holding collars and having means thereon to adjustably secure the straps together, and means to adjustably connect the lower ends of the hames.

In witness whereof I hereunto subscribe my name in the presence of two witnesses.

JOHN S. ASCHLIMAN.

Witnesses:
HELEN F. GLENN,
ELWIN M. HULSE.

---

Copies of this patent may be obtained for five cents each, by addressing the "Commissioner of Patents, Washington, D. C."